(12) United States Patent
Do et al.

(10) Patent No.: US 9,325,599 B2
(45) Date of Patent: Apr. 26, 2016

(54) METHODS FOR PROVIDING A STATUS TO DEVICES IN A DISTRIBUTED SYSTEM

(71) Applicant: ShoreTel, Inc., Sunnyvale, CA (US)

(72) Inventors: Nam Do, Pleasanton, CA (US); Vu Hwang, San Jose, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 238 days.

(21) Appl. No.: 13/925,527

(22) Filed: Jun. 24, 2013

(65) Prior Publication Data

US 2013/0294260 A1 Nov. 7, 2013

Related U.S. Application Data

(63) Continuation-in-part of application No. 12/975,679, filed on Dec. 22, 2010, now Pat. No. 8,493,892, which is a continuation-in-part of application No. 12/414,238, filed on Mar. 30, 2009, now Pat. No. 8,359,354.

(51) Int. Cl.
| | |
|---|---|
| *H04L 12/50* | (2006.01) |
| *H04L 12/26* | (2006.01) |
| *H04M 3/56* | (2006.01) |
| *H04M 7/00* | (2006.01) |

(52) U.S. Cl.
CPC .............. *H04L 43/10* (2013.01); *H04M 3/56* (2013.01); *H04M 7/006* (2013.01); *H04M 2207/20* (2013.01)

(58) Field of Classification Search
CPC ....... H04M 3/56; H04M 3/568; H04M 3/563; H04M 3/564; H04M 3/567; H04M 3/54; H04M 3/436; H04M 3/42102; H04M 2203/2011; H04M 3/46; H04L 12/437; H04L 12/42; H04L 12/4637; H04J 3/085; H04J 2203/006

USPC ............ 370/250, 403, 460, 352; 379/202.01, 379/211.02

See application file for complete search history.

(56) References Cited

U.S. PATENT DOCUMENTS

| | | | | |
|---|---|---|---|---|
| 4,621,362 | A  * | 11/1986 | Sy ................................. | 370/403 |
| 6,782,413 | B1 | 8/2004 | Loveland | |
| 6,940,826 | B1 * | 9/2005 | Simard et al. ................. | 370/260 |
| 6,987,847 | B1 | 1/2006 | Murphy et al. | |

(Continued)

OTHER PUBLICATIONS

Non-Final Office Action of Oct. 4, 2010 for U.S. Appl. No. 12/414,238, 16 pages.

(Continued)

*Primary Examiner* — Andrew Chriss
*Assistant Examiner* — Atique Ahmed
(74) *Attorney, Agent, or Firm* — Kilpatrick Townsend & Stockton LLP

(57) ABSTRACT

A method for providing a status to a plurality of devices in a distributed VoIP system includes circulating a first status data packet between each device in the first group of devices and circulating a second status data packet between each device in the second group of devices. One device in the first group of devices participates in circulating both the first status data packet and the second status data packet, while the other devices in the first group of devices circulate only the first status data packet. One device in the second group of devices participates in circulating both the first status data packet and the second status data packet, while the other devices in the second group of devices circulate only the second status data packet.

18 Claims, 11 Drawing Sheets

(56) References Cited

U.S. PATENT DOCUMENTS

| | | |
|---|---|---|
| 6,996,059 B1 | 2/2006 | Tonogai |
| 7,003,091 B1 | 2/2006 | Burns et al. |
| 7,092,386 B2 | 8/2006 | Wynn |
| 7,167,486 B2 | 1/2007 | Cornelius et al. |
| 7,379,540 B1 | 5/2008 | Van Gundy |
| 7,386,114 B1 | 6/2008 | Robesky |
| 7,567,662 B1 | 7/2009 | Renner et al. |
| 8,060,563 B2 | 11/2011 | Whynot et al. |
| 8,359,354 B1* | 1/2013 | Do et al. .................. 709/204 |
| 8,493,892 B1 | 7/2013 | Do et al. |
| 2002/0075303 A1* | 6/2002 | Thompson et al. ........... 345/751 |
| 2002/0075305 A1 | 6/2002 | Beaton et al. |
| 2002/0075306 A1 | 6/2002 | Thompson et al. |
| 2002/0076025 A1 | 6/2002 | Liversidge et al. |
| 2002/0078150 A1 | 6/2002 | Thompson et al. |
| 2003/0021400 A1 | 1/2003 | Grandgent et al. |
| 2004/0008720 A1* | 1/2004 | Wang et al. ................... 370/460 |
| 2004/0010541 A1* | 1/2004 | Allen et al. ................... 709/203 |
| 2004/0091089 A1 | 5/2004 | Wynn |
| 2005/0074107 A1* | 4/2005 | Renner et al. ............ 379/202.01 |
| 2006/0177034 A1* | 8/2006 | Reding et al. ............ 379/211.02 |
| 2006/0233340 A1 | 10/2006 | Tovino et al. |
| 2007/0041366 A1* | 2/2007 | Vugenfirer et al. ........... 370/352 |
| 2007/0171098 A1 | 7/2007 | Basart et al. |
| 2008/0010163 A1 | 1/2008 | Kish |
| 2008/0107017 A1* | 5/2008 | Yuan et al. .................... 370/228 |
| 2008/0112336 A1 | 5/2008 | Gray |
| 2008/0205622 A1 | 8/2008 | Robsky |
| 2010/0165889 A1* | 7/2010 | Madabhushi et al. ........ 370/261 |
| 2012/0082066 A1* | 4/2012 | O'Sullivan .......... H04L 12/1818 370/260 |

OTHER PUBLICATIONS

Final Office Action of Apr. 1, 2011 for U.S. Appl. No. 12/414,238, 16 pages.

Notice of Allowance of Nov. 23, 2012 for U.S. Appl. No. 12/414,238, 16 pages.

Non-Final Office Action of Sep. 14, 2012 for U.S. Appl. No. 12/975,679, 22 pages.

Notice of Allowance of Apr. 16, 2013 for U.S. Appl. No. 12/975,679, 20 pages.

* cited by examiner

| Bytes | Field | Description |
|---|---|---|
| 0-4 | packetID | unique ID of the status data packet |
| 5-8 | headerLen | length of the header |
| 9-12 | DevInfoLen | fixed size of the DevInfo data structure |
| 13-16 | numberDev | number of device data structures in this packet |
| 17-20 | time | time packet was generated |
| 21-23 | packetNumber | number of packets out of Total |
| 24-25 | packetTotal | Total number of packets |
| 26-29 | flags | flags |
| 30-33 | count | circulation counter |
| 34-56 | DevList | list of Dev in system |
| 57 + sizeof(DevInfo) + nMeetings | DevInfo | balance of the DevInfo array |

FIG. 6

| Bytes | Field | Description |
|---|---|---|
| 0-4 | DevID | device ID |
| 5-8 | numMeetings | number of meetings hosted by the device |
| 9 | numAudioAttendees | number of users attached to Audio meetings |
| 10 | numWebAttendees | number of users attached to Web meetings |
| 11 | numVideoAttendees | number of users attached to Video meetings |
| 12 | reserved | reserved |
| 13-16 | activeBackupDev | DevID of the active backup |
| 17-20 | lastUpdateTime | time of the last status update |
| 21-22 | DevPacketNumber | number of packet out of total for multiple spanning packet |
| 23-24 | DevPacketTotal | total number of packet for Dev packet |
| 25-28 | ipAddress | IP address of the device |
| 29-32 | varPayloadSize | size of the variable text payload |
| 33-48 | reserved | reserved for future use |
| 49+nMeetings*4 | Meetings | array of meeting IDs (4 bytes per meeting ID) |

FIG. 7

METHODS FOR PROVIDING A STATUS TO DEVICES IN A DISTRIBUTED SYSTEM

CROSS-REFERENCE TO RELATED APPLICATIONS

The present application is a continuation-in-part of U.S. patent application Ser. No. 12/975,679, filed Dec. 22, 2010, which is a continuation-in-part of U.S. patent application Ser. No. 12/414,238, filed Mar. 30, 2009, the disclosures of which are incorporated herein by reference for all purposes.

BACKGROUND

The present invention relates generally to methods for providing a status to devices in a distributed system. Merely by way of example, embodiments of the present invention provide a method for providing a meeting status to conference bridges in a distributed Voice over-Internet Protocol (VoIP) system. The scope of embodiments of the present invention is broader than this particular application, however, and can be applied to other applications and distributed systems.

VoIP systems route voice conversations and other communications over the Internet or other packet switched networks. A distributed VoIP system typically includes a distributed set of devices, such as switches, servers, and conference bridges that provide applications enabled by the integration of computer systems with telephony services.

A distributed system increases system performance and reliability by eliminating single points of failure. If a device in the system fails, other devices can backup the failed device by providing the services and functions of the failed device. However, this redundancy requires that extra resources be available within the system. For example, if a switch supporting 10 IP phones fails, the remaining switches in the system must have the capacity to support the 10 IP phones that were being supported by the failed switch. To provide the extra resources, a system may be designed to have extra capacity to support the failure of any device in the system.

Additionally, to be able to backup other devices, each device must know or have access to the necessary configuration of the other devices within the system. Continuing the example above, the switches that backup the failed switch need to know the configuration of the failed switch (e.g. time zone, language preference, dialing prefix, local area code). This also requires extra resources because the configuration of each device must be known or available to the other devices in the system (e.g. stored in memory or stored in a central location).

The devices also need to know the status of other devices in the system. For example, each conference bridge within a VoIP system needs to know which meetings are being hosted by other conference bridges as well as the participants associated with each meeting. In the event a conference bridge fails, the other conference bridges in the system can backup the failed device and host the meetings that were in progress. Knowing the status of the other devices also enables resources to be shared and managed to improve the performance of the system. For example, if the resources of a particular conference bridge are being utilized near capacity, and a new meeting request is received by the conference bridge, the request may be routed to another conference bridge in the system that is better suited to host the new meeting. This also requires extra resources because the status of each device must be known or available to the other devices in the system. Additionally, the status must be kept current through periodic updates.

Conventional methods for providing a status to devices in a distributed system include a broadcast method and a central server method. The broadcast method involves periodic status updates that are broadcast from each device to all of the other devices in the system. This method, however, leads to a significant increase in network traffic. For example, if each device in a system sends a status message to every other device in the system, $N*(N-1)$ status messages are sent for each status update (where N is the number of devices in the system). As the number of devices in the system increases, the number of status messages required for each update increases geometrically.

The central server method involves periodic status updates that are sent from each device to a central server, and periodic system status updates that are sent from the central server to each device. However, this method reduces the reliability of the system because the central server is a single point of failure. This method also increases network traffic. For example, if each device sends a status message to a central server, and the central server sends a system status message to each device in the system, $2*N$ status messages are sent for each status update (where N is the number of devices in the system).

Thus, there is a general need in the art for improved methods of providing a status to devices in a distributed system.

SUMMARY

The present invention provides improved methods for providing a status to devices in a distributed system. Merely by way of example, one embodiment provides a method for providing a meeting status to conference bridges in a distributed VoIP system. The present invention also provides methods and apparatuses for resolving conflicts in distributed systems. As an example, one embodiment provides a method for resolving conflicts between conference bridges in a distributed conferencing system. Another embodiment provides a method for initially determining which conference bridge in a distributed conferencing system will provide a resource for a particular meeting. The scope of embodiments of the present invention is broader than these particular applications, however, and can be applied to other applications and distributed systems.

According to an embodiment of the present invention, a method for resolving conflicts between conference bridges in a distributed conferencing system includes determining that a conflict exists between a first conference bridge and a second conference bridge in the distributed conferencing system. The conflict may arise from the first conference bridge and the second conference bridge independently providing a meeting resource for a first meeting that is to be provided by a single conference bridge in the distributed conferencing system. The method also includes determining independently at the first conference bridge and at the second conference bridge that the meeting resource for the first meeting is to be provided by the first conference bridge. In determining that the meeting resource is to be provided by the first conference bridge, there is a probability of determining that the meeting resource is to be provided by the second conference bridge. The first conference bridge and the second conference bridge may utilize the same process in determining which conference bridge is to provide the meeting resource for the first meeting. The method also includes providing the meeting resource for the first meeting at the first conference bridge, and stopping providing the meeting resource for the first meeting at the second conference bridge.

According to another embodiment of the present invention, a method for resolving conflicts between conference bridges in a distributed conferencing system includes providing a first meeting resource for a first meeting at a first conference bridge and receiving a status data packet at the first conference bridge. The status data packet may include a list of meeting resources provided by one or more of the conference bridges in the distributed conferencing system. The method also includes determining at the first conference bridge that a conflict exists with a second conference bridge in the distributed conferencing system. The conflict may arise from the first conference bridge and the second conference bridge independently providing the first meeting resource for the first meeting. The method also includes determining at the first conference bridge that the first meeting resource for the first meeting is to be provided by the second conference bridge. In determining that the first meeting resource is to be provided by the second conference bridge a process is utilized that provides a probability of determining that the first meeting resource is to be provided by the first conference bridge. The method also includes stopping providing the first meeting resource for the first meeting.

According to another embodiment of the present invention, a computer readable medium including computer program code for resolving conflicts between conference bridges in a distributed conferencing system includes code for determining that a conflict exists between a first conference bridge and a second conference bridge in the distributed conferencing system. The conflict may arise from the first conference bridge and the second conference bridge independently providing a meeting resource for a first meeting that is to be provided by a single conference bridge in the distributed conferencing system. The computer readable medium also includes code for determining that the meeting resource for the first meeting is to be provided by the first conference bridge. In determining that the meeting resource is to be provided by the first conference bridge there, is a probability of determining that the meeting resource is to be provided by the second conference bridge.

According to another embodiment of the present invention, a conference bridge configured to resolve conflicts in a distributed conferencing system includes a providing module configured to provide a meeting resource for a first meeting and a receiving module configured to receive a status data packet. The status data packet may include a list of meeting resources provided by one or more conference bridges in the distributed conferencing system. The conference bridge also includes a first determining module configured to determine that a conflict exists between the first conference bridge and a second conference bridge in the distributed conferencing system. The conflict may arise from the first conference bridge and the second conference bridge independently providing the meeting resource for the first meeting that is to be provided by a single conference bridge in the distributed conferencing system. The conference bridge also includes a second determining module configured to determine that the meeting resource for the first meeting is to be provided by the first conference bridge. In determining that the meeting resource is to be provided by the first conference bridge a process is utilized that provides a probability of determining that the meeting resource is to be provided by the second conference bridge.

According to another embodiment of the present invention, a method for providing a status to conference bridges in a distributed system includes receiving a status data packet. The status data packet may be received from a first conference bridge and include the status of the first conference bridge. The method also includes saving the status of the first conference bridge to a memory of the second conference bridge, updating the status data packet with a status of the second conference bridge, and obtaining a list of the conference bridges in the distributed system. The list may be associated with a sequence for circulating the status data packet between the conference bridges. The sequence may reduce a time required to provide a status to each of the conference bridges by minimizing a number of higher network lag communications between the conference bridges. The method also includes sending the status data packet including the status of the first conference bridge and the status of the second conference bridge from the second conference bridge to a next conference bridge in the sequence.

According to another embodiment of the present invention, a method for providing a status to a plurality of devices in a distributed VoIP system includes circulating a first status data packet between each device in a first group of devices and circulating a second status data packet between each device in a second group of devices. One device in the first group of devices may participate in circulating both the first status data packet and the second status data packet, while the other devices in the first group of devices circulate only the first status data packet. One device in the second group of devices may participate in circulating both the first status data packet and the second status data packet, while the other devices in the second group of devices circulate only the second status data packet.

In an embodiment, the one device in the first group of devices that participates in circulating both the first status data packet and the second status data packet and the one device in the second group of devices that participates in circulating both the first status data packet and the second status data packet are the same device.

In another embodiment, the one device in the first group of devices that participates in circulating both the first status data packet and the second status data packet updates the first status data packet with a status of each of the devices in the second group of devices and updates the second status data packet with a status of each of the devices in the first group of devices.

In another embodiment, the one device in the first group of devices that participates in circulating both the first status data packet and the second status data packet is selected based on a device identification number of the one device compared to device identification numbers of the other devices in the first group of devices.

In another embodiment, each of the devices in the first group of devices has a network lag that on average is different from that of each of the devices in the second group of devices.

In another embodiment, the plurality of devices are conference bridges.

In yet another embodiment, the plurality of devices include a third group of devices, and the method also includes circulating a third status data packet between each of the devices in the third group of devices. One device in the third group of devices may participate in circulating both the third status data packet and the second status data packet, while the other devices in the third group of devices circulate only the third status data packet.

According to yet another embodiment of the invention, a non-transitory computer readable medium includes computer program code for providing a status to a plurality of devices in a distributed VoIP system. The non-transitory computer readable medium includes code for circulating a first status data packet between each device in a first group of devices and code for circulating a second status data packet between each device in a second group of devices. One device in the first group of devices may participate in circulating both the first status data packet and the second status data packet, while the other devices in the first group of devices circulate only the first status data packet. One device in the second group of devices may participate in circulating both the first status data packet and the second status data packet, while the other devices in the second group of devices circulate only the second status data packet.

Numerous benefits are achieved using the present invention over conventional techniques. For example, some embodiments provide a sequence for circulating a status data packet between devices that can reduce circulation time. This is the time required to provide a status update to each device (or each connected device) within a system. Other embodiments provide groupings of devices that can reduce circulation time. Reducing the circulation time can improve synchronization between devices and consequently reduce collisions. Depending upon the embodiment, one or more of these benefits may exist. These and other benefits are described throughout the present specification and more particularly below.

BRIEF DESCRIPTION OF THE DRAWINGS

FIG. 6 is a table illustrating an exemplary header structure of a status data packet;

FIG. 7 is a table illustrating an exemplary device status structure of a status data packet;

DETAILED DESCRIPTION

In accordance with embodiments of the present invention, improved methods for providing a status to devices in a distributed system are provided. Some embodiments reduce network traffic by minimizing the number of status messages required to provide a status update to each device in the system. Other embodiments improve system performance and reliability by circulating status messages between devices thus eliminating single points of failure. These and other embodiments of the invention, as well as other features and advantages, are described in more detail below.

Figure 1:
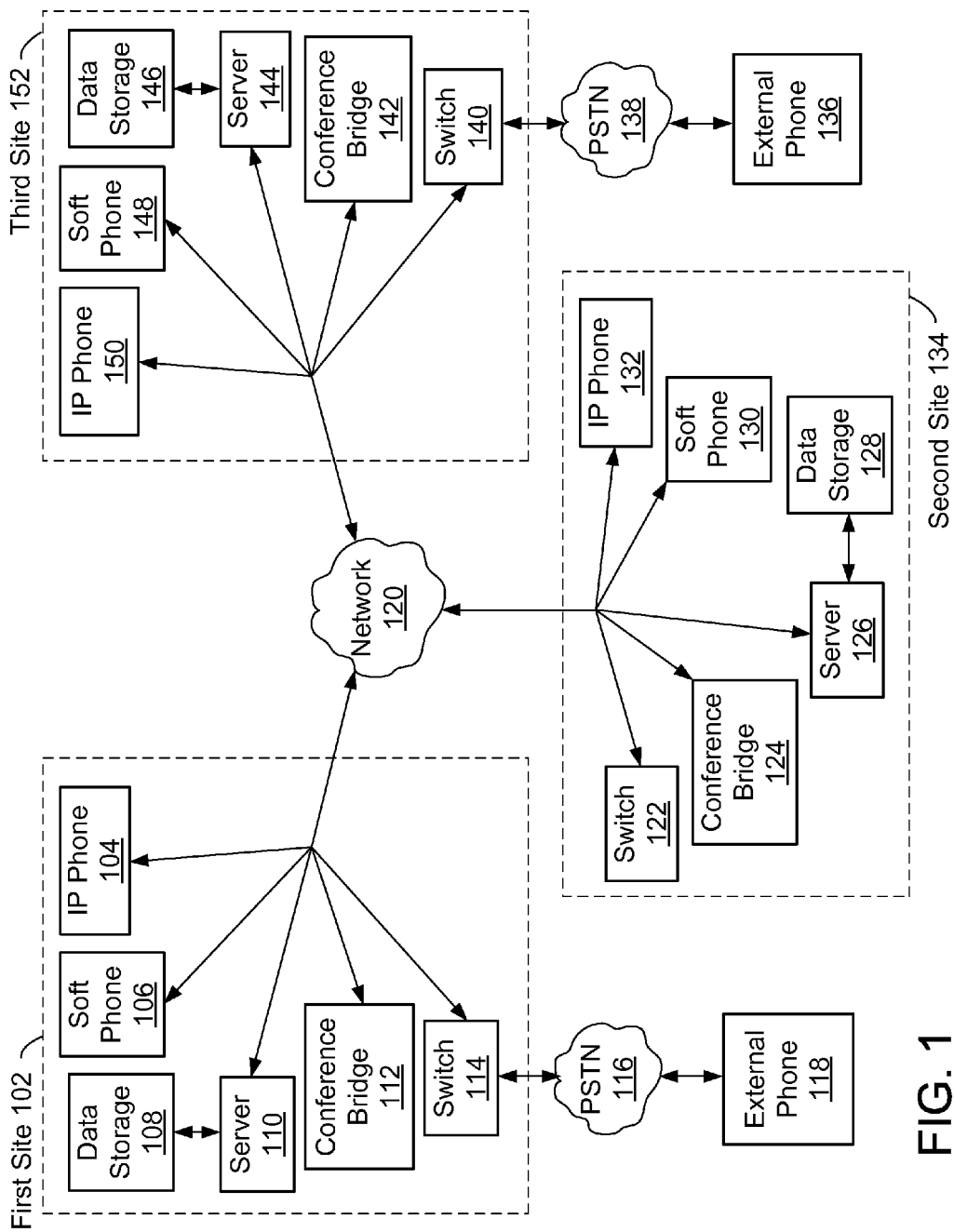
FIG. 1 is a simplified schematic diagram of a distributed VoIP system according to an embodiment of the present invention.

FIG. 1 is a simplified schematic diagram of a distributed VoIP system according to an embodiment of the present invention. The system illustrated in FIG. 1 includes three groupings of devices labeled as first site 102, second site 134, and third site 152. As used herein, a site may represent a grouping of devices or resources that is physically distinct from other groupings of devices. Alternatively, a site may represent a topology-related grouping of devices that are not in physically distinct locations. Also, while the system illustrated in FIG. 1 shows three sites that each include similar groupings of devices, embodiments of the present invention are not so limited. For example, the present invention may apply to systems with more or fewer sites as well as sites with different devices and configurations compared to other sites in the system. One of ordinary skill in the art would recognize many variations, modifications, and alternatives.

As shown in FIG. 1, first site 102, second site 134, and third site 152 are communicatively coupled via network 120. The network 120 may be the Internet or another packet switched network over which the distributed VoIP system operates.

In the example illustrated in FIG. 1, first site 102 includes several devices including server 110, conference bridge 112, and switch 114. First site 102 also includes communication devices such as IP phone 104 and soft phone 106. Also included within first site 102 is a data storage device labeled as data storage 108. Each of these components within first site 102 may communicate with each other via network 120 or via a local network.

Switch 114 may communicate with IP phone 104 and soft phone 106 to establish communications channels that are used to make and receive calls. Switch 114 manages call setup and resource allocation by provisioning an extension for IP phone 104 and soft phone 106. In the example illustrated in FIG. 1, switch 114 is also coupled to PSTN 116. Switch 114 and PSTN 116 may be coupled via an analog or digital trunk line (e.g. a T1 or E1 interface). In the illustrated configuration, switch 114 provides an interface between the VoIP system and the PSTN 116.

Switch 114 typically includes familiar software and hardware components. For example, switch 114 may include an operating system, processor, local memory for storage, I/O devices, and a system bus interconnecting the hardware components. RAM and disk drives are examples of local memory for storage of data and computer programs. Other types of local memory include magnetic storage media, optical storage media, flash memory, networked storage devices, and the like.

Other communication devices that are used to make or receive phone calls, messages, or other communications may also be included within the VoIP system. For example, although not shown in the example illustrated in FIG. 1, a VoIP system may include analog or digital phones, button boxes, "virtual phones" (e.g. extensions that are not assigned to a specific device), IP trunks (e.g. endpoints that can make inbound and outbound calls to the PSTN and to other telephony systems), and other communication devices.

Server 110 may be configured to implement the applications of the VoIP system. For example, server 110 may be configured to provide voicemail features to IP phone 104 and soft phone 106. Server 110 may store data in local memory or in data storage 108. Server 110 typically includes familiar software and hardware components. For example, server 110 may include an operating system, processor, local memory for storage, I/O devices, and a system bus interconnecting the hardware components. RAM and disk drives are examples of local memory for storage of data and computer programs. Other types of local memory include magnetic storage media, optical storage media, flash memory, networked storage devices, and the like. In some embodiments, server 110 may include more than one server (e.g. server cluster).

In an embodiment, server 110 may be linked directly to data storage 108 as shown in FIG. 1. In another embodiment, data storage 108 may be linked to server 110 via the network 120 or a local network. Data storage 108 is configured to store and maintain data. For example, data storage 108 may be configured to store and maintain voicemail messages, voicemail data, site configuration data, and other information. Data storage 108 may be any conventional database such as those powered by My SQL, Oracle, Sybase, and the like, or other data sources such as an LDAP server.

Conference bridge 112 may be configured to provide conferencing applications to participants in conference meetings. The participants may include users outside the VoIP system, such as a user connected to a meeting through external phone 118 or external phone 136, and users within the VoIP system, such as a user connected to a meeting through IP phone 104 or IP phone 132. Conferencing applications provided by conference bridge 112 may include audio conferencing, web conferencing, document sharing, application sharing, instant messaging, integrated audio and visual recording, and other applications.

Conference bridge 112 typically includes familiar software and hardware components. For example, conference bridge 112 may include an operating system, processor, local memory for storage, I/O devices, and a system bus interconnecting the hardware components. RAM and disk drives are examples of local memory for storage of data and computer programs. Other types of local memory include magnetic storage media, optical storage media, flash memory, networked storage devices, and the like.

In the VoIP system illustrated in FIG. 1, second site 134 includes several devices including server 126, conference bridge 124, and switch 122. Second site 134 also includes communication devices such as IP phone 132 and soft phone 130. Also included within second site 134 is a data storage device labeled as data storage 128. Similar to the components within first site 102, each of these components within second site 134 may communicate with each other via network 120 or via a local network. Each of the components within second site 134 may be configured in a manner similar to the components within first site 102 described above.

In the VoIP system illustrated in FIG. 1, third site 152 includes several devices including server 144, conference bridge 142, and switch 140. Switch 140 is coupled to PSTN 138. PSTN 138 may be coupled with various communication devices, including external phone 136. Switch 140 and PSTN 138 may be coupled via an analog or digital trunk line (e.g. a T1 or E1 interface). In the illustrated configuration, switch 140 provides an interface between the VoIP system and the PSTN 138. Third site 152 also includes communication devices such as IP phone 150 and soft phone 148. Also included within third site 152 is a data storage device labeled as data storage 146. Similar to the components within the other sites, each of the components within third site 152 may communicate with each other via network 120 or via a local network. Each of the components within third site 152 may be configured in a manner similar to the components within first site 102 described above.

It is to be understood that FIG. 1 is presented merely as an exemplary embodiment to illustrate some of the features and functionality of the present invention. Not all distributed VoIP systems include the components shown in FIG. 1. Likewise, some distributed VoIP systems include additional components that are not included in the VoIP system of FIG. 1. One of ordinary skill in the art would recognize many variations, modifications, and alternatives. For example, in some configurations the components shown in FIG. 1 may be combined or provide functionality that is different from that described herein. Thus, the present invention can be embodied in many different forms and should not be construed as limited to the embodiments set forth herein.

In accordance with embodiments of the present invention, methods for providing a status to devices in a distributed system, such as the distributed VoIP system illustrated in FIG. 1, are provided. For example, in accordance with an embodiment, a method for providing a status to conference bridge 112, conference bridge 124, and conference bridge 142 is provided. The status may include the meetings that are being hosted by each conference bridge and the participants associated with each meeting. In accordance with another embodiment, a method for providing a status to server 110, server 126, and server 144 is provided. Here, the status may include voicemail messages or other data that may be used to backup a failed server or to manage system resources. Similarly, in accordance with yet another embodiment, a method for providing a status to switch 114, switch 122, and switch 140 is provided. Here, the status may include the number of calls the switch is supporting and the communication devices associated with each call. The scope of embodiments of the present invention is broader than these particular applications, however, and can be applied to other applications and distributed systems. One of ordinary skill in the art would recognize many variations, modifications, and alternatives.

Figure 2:
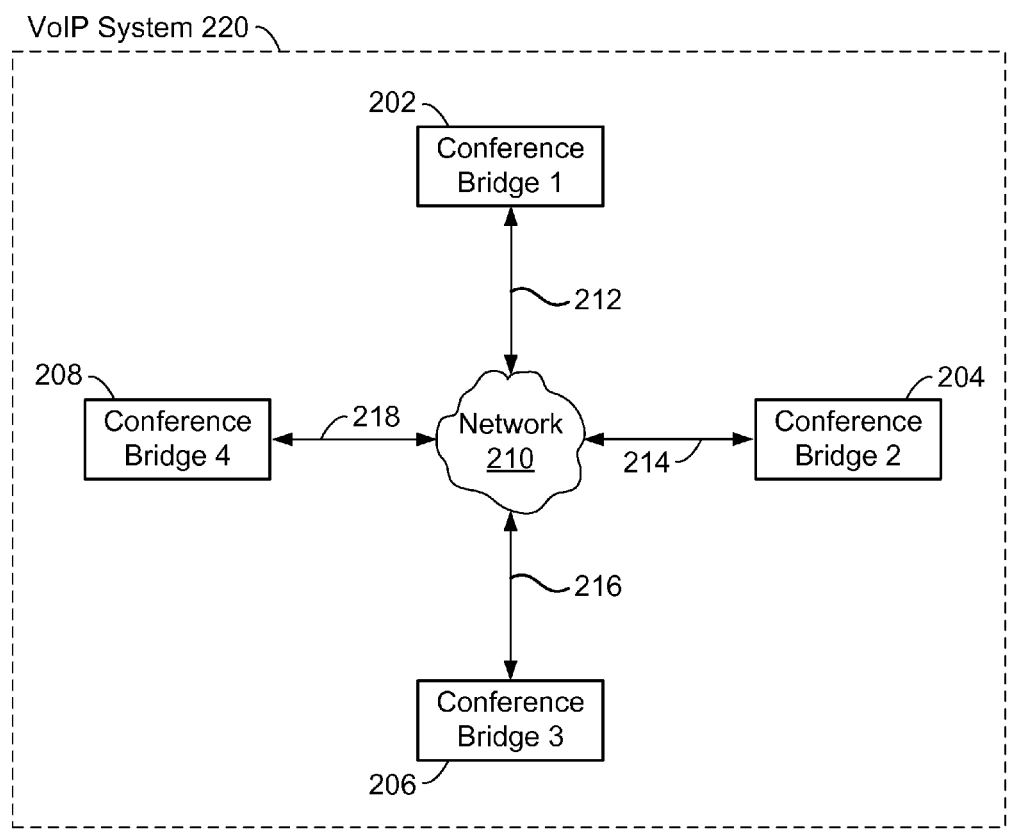
FIG. 2 is a simplified schematic diagram of conference bridges in a distributed VoIP system according to an embodiment of the present invention.

FIG. 2 is a simplified schematic diagram of the conference bridges in a distributed VoIP system according to an embodiment of the present invention. VoIP system 220 includes conference bridge 202, conference bridge 204, conference bridge 206, and conference bridge 208. Although not shown in FIG. 2, each of the conference bridges may be part of the same or different sites within VoIP system 220. Also, although conference bridges are used in the example illustrated in FIG. 2, it is to be understood that the method may be used to provide a status between other devices in a distributed system.

Each of the conference bridges illustrated in FIG. 2 are communicatively coupled to network 210. For example, conference bridge 202 is coupled to network 210 via link 212, conference bridge 204 is coupled to network 210 via link 214, conference bridge 206 is coupled to network 210 via link 216, and conference bridge 208 is coupled to network 210 via link 218.

In accordance with an embodiment of the present invention, a status is provided between the conference bridges illustrated in FIG. 2. For example, in one embodiment a status data packet is generated by conference bridge 202 that includes the status of conference bridge 202. The status may include the meetings that are being hosted by conference bridge 202 and the participants associated with each meeting. The data packet is sent from conference bridge 202 to conference bridge 204. Conference bridge 204 receives the data packet and saves the status of conference bridge 202 to memory. For example, the status of conference bridge 202 may be saved in local memory or stored in external data storage. Conference bridge 204 sends the data packet to conference bridge 206. Conference bridge 206 receives the data packet and saves the status of conference bridge 202 to memory. Conference bridge 206 sends the data packet to conference bridge 208. Conference bridge 208 receives the data packet and saves the status of conference bridge 202 to memory. Thus, N−1 status messages are required to provide the status of conference bridge 202 to each conference bridge in the system (where N is the number of devices in the system). In one embodiment, conference bridge 208 sends the data packet to conference bridge 202. Conference bridge 202 receives the data packet and determines if its status has changed. If the status of conference bridge 202 has changed, conference bridge 202 updates its status and sends the data packet with the updated status to conference bridge 204, and the process of receiving the data packet, storing the status, and sending the data packet to the next conference bridge repeats. If the status of conference bridge 202 has not changed, conference bridge 202 may send the data packet without updating the status to conference bridge 204, or conference bridge 202 may wait until its status has changed and then update its status and send the data packet with the updated status to conference bridge 204.

In accordance with another embodiment of the present invention, the status data packet includes a status of each device in the distributed system. For example, in one embodiment a data packet is generated by conference bridge 202 that includes the status of conference bridge 202. The data packet is sent from conference bridge 202 to conference bridge 204. Conference bridge 204 receives the data packet and saves the status of conference bridge 202 to memory. Conference bridge 204 updates the data packet with its status. Conference bridge 204 sends the updated data packet to conference bridge 206. Conference bridge 206 receives the data packet and saves the status of conference bridges 202, 204 to memory. Conference bridge 206 updates the data packet with its status. Conference bridge 206 sends the updated data packet to conference bridge 208. Conference bridge 208 receives the data packet and saves the status of conference bridges 202, 204, 206 to memory. Conference bridge 208 updates the data packet with its status. Conference bridge 208 sends the updated data packet to conference bridge 202. Conference bridge 202 receives the data packet and saves the status of conference bridges 204, 206, 208 to memory. In one embodiment, conference bridge 202 determines if its status has changed. If the status of conference bridge 202 has changed, conference bridge 202 updates the data packet with its status and sends the updated data packet to conference bridge 204. Conference bridge 204 receives the data packet and saves the status of conference bridges 202, 206, 208 to memory, and the process of receiving the data packet, storing the status of each conference bridge, updating the status, and sending the data packet to the next conference bridge repeats. If the status of conference bridge 202 has not changed, conference bridge 202 may send the data packet without updating its status to conference bridge 204. One of ordinary skill in the art would recognize many variations, modifications, and alternatives.

As illustrated in the above examples, methods according to the present invention provide a status to devices in a distributed system with minimal impact on network traffic. For example, providing a status to each device in the system requires only N or fewer status messages (where N is the number of devices in the system). Furthermore, such methods are scalable in that one additional status message is required for each additional device added to the system.

In accordance with an embodiment of the present invention, a circulation counter is associated with the status data packet. The circulation counter is incremented as the status data packet is circulated between the devices in the system. For example, the circulation counter may be incremented by each device that receives the status data packet, or it may be incremented by only one device in the system each time the status data packet is received by that device. In one embodiment, the device that updates the circulation counter is determined according to a device identification. Using the conference bridges in FIG. 2 as an example, conference bridge 202 may update the circulation counter because it has the lowest device identification number in the system (or conference bridge 208 because it has the highest device identification number in the system). If conference bridge 202 is offline, the conference bridge with the next lowest device identification number may update the circulation counter. One of ordinary skill in the art would recognize many variations, modifications, and alternatives. Further, the circulation counter may be stored by only one device in the system or at only a single location, or it may be included as part of the data carried by the data packet.

In accordance with another embodiment, each device in the system is arranged in a sequence or order and the status data packet is sent between devices according to the sequence. Using VoIP system 220 in FIG. 2 as an example, the conference bridges may be ordered by device identification number, with conference bridge 1 (202) being first, conference bridge 2 (204) being second, conference bridge 3 (206) being third, and conference bridge 4 (208) being fourth in the sequence. The first device in the sequence follows the last device. For example, conference bridge 4 (208) may send the status data packet to conference bridge 1 (202) to continue the sequence.

Furthermore, the sequence may be pre-defined at a system level or it may be dynamic and updated periodically. For example, the sequence may be determined at the time the status data packet is generated and included as a list in the data packet. In this case, each conference bridge determines the next conference bridge in the sequence according to the list. Also, the list may be updated on a periodic basis. For example, the list may be obtained by query from a particular database in the system and updated at set time intervals or based on the circulation counter. One of ordinary skill in the art would recognize many variations, modifications, and alternatives.

In accordance with another embodiment, each device that receives a status data packet sends an acknowledgement of receipt to the device that sent the data packet. Accordingly, each device listens for an acknowledgement of receipt after sending a status data packet. If an acknowledgement of receipt is not received, the device assumes that the status data packet was not received. In this scenario, the status data packet may be re-sent to the device that failed to send an acknowledgement of receipt, or it may be sent to the following device in the sequence.

Figure 3:
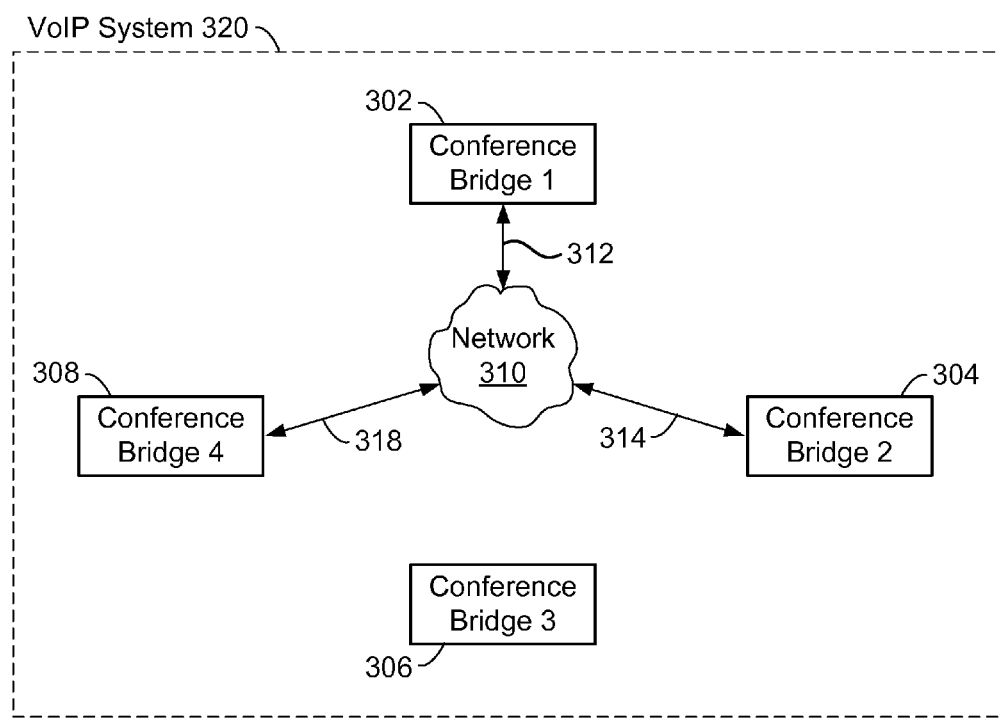
FIG. 3 is a simplified schematic diagram of conference bridges in a distributed VoIP system according to another embodiment of the present invention.

Using the system illustrated in FIG. 3 as an example, a status data packet is sent by conference bridge 304 to conference bridge 306. As illustrated in FIG. 3, however, conference bridge 306 is not coupled to network 310. Such a scenario may arise when a network connection is lost or a device in the system is offline. Because conference bridge 306 is not coupled to network 310, the status data packet is not received and an acknowledgement of receipt is not sent to conference bridge 304. After waiting a period of time, conference bridge 304 may send the status data packet to the following device in the sequence, which is conference bridge 308 in this example. The period of time may be a set time or it may be dependent on network traffic or resource utilization. As illustrated in FIG. 3, conference bridge 308 is coupled to network 310. After receiving the status data packet, conference bridge 308 sends an acknowledgement of receipt to conference bridge

304. Conference bridge 308 then circulates the status data packet as described above, sending it to conference bridge 302. Conference bridge 302 sends an acknowledgement of receipt to conference bridge 308 and sends the status data packet to conference bridge 304. Conference bridge 304 sends an acknowledgement of receipt to conference bridge 302. Since conference bridge 304 did not receive an acknowledgement of receipt from conference bridge 306 during the previous circulation of the data packet, conference bridge 304 may attempt to send the status data packet to conference bridge 306 once again. Alternatively, conference bridge 304 may send the status data packet to conference bridge 308 and only attempt to send the status data packet to conference bridge 306 after a predetermined number of circulations of the status data packet. For example, conference bridge 304 may send the status data packet to conference bridge 306 every other circulation or every third circulation of the status data packet. As illustrated in the above example, embodiments of the present invention can improve performance and reliability by eliminating single points of failure in a distributed system.

In accordance with another embodiment, a status data packet may be sent to the next device in the sequence as soon as it is processed. Alternatively, a status data packet may be sent to the next device in the sequence after waiting a period of time. This may be used to balance network traffic with the requirements of a particular system. For example, if a status data packet can be circulated to each device in a system in one second, and according to system requirements status updates are required at least once every five seconds, each device may wait a period of time before sending the status data packet to reduce network traffic. The period of time may be predetermined, or it may be determined depending on the number of devices in the system, system utilization, network traffic, and the like. One of ordinary skill in the art would recognize many variations, modifications, and alternatives.

In accordance with another embodiment, each status data packet is associated with a unique identifier and includes a time the data packet was generated. When a device receives a status data packet, it compares the identifier and time with the previous status data packet it received. If the status data packet has a different identifier than the previous data packet and a more recent time, it may process the data packet and send it to the next device as explained above. If the status data packet has a different identifier than the previous data packet and an older time, it may discard the data packet. Alternatively, the data packet with the more recent time may be discarded and the data packet with the older time may be processed and sent to the next device.

A discarded data packet is not sent to the next device thus stopping the circulation of that data packet. This is to ensure that only one status data packet is circulated at a time. For example, if a status data packet is delayed and a device starts a new status data packet into circulation, one of the data packets will be discarded so that only one status data packet is circulated. As another example, the devices in a system may get separated into more than one group with each group circulating a status data packet between the devices in that group. When the groups are merged, one of the status data packets will be discarded. A scenario where more than one group of devices exists may arise, for example, when a group of devices that are offline are brought online at approximately the same time and one or more of the devices start a new status data packet into circulation. As explained above with regard to FIG. 3, a device that is online may attempt to send a status data packet to a device that is offline after a predetermined number of circulations of the status data packet. In this scenario, after the predetermined number of circulations the status data packet will be sent to one of the devices that had previously been offline, and the groups of devices will be merged into a single group and one of the status data packets will be discarded.

In accordance with another embodiment of the present invention, each device in the system expects to receive periodic status updates via the status data packets. For example, each device may maintain a time associated with the last status update it received and have an expectation of receiving another status update within a certain period of time. If a device does not receive another status update within the period of time, the device may generate a new status data packet and send it to the next device in the sequence. Here, the period of time may be a set time, or it may be determined based on network traffic, resource utilization, or the number of devices in the system. The new status data packet may include only the status of the device generating the status data packet, or it may include the last known status of each device in the system. Such a method may also be used to start a status data packet into circulation upon bringing a system on-line or adding a new device to the system.

In accordance with another embodiment of the present invention, the status of each device includes a time stamp. The time stamp is the time at which the status was last updated. A time stamp can serve several functions. For example, a time stamp allows a device to determine how long it takes for the status data packet to circulate between the devices in the system. A time stamp also provides information on how current the status is from each of the other devices in the system. Continuing with the example illustrated in FIG. 3, the status of conference bridge 306 will not be updated while it is offline. This will be reflected in the time stamp associated with the status of conference bridge 306. This can provide information on the health of the devices in the system. For example, this can be used as an indicator that a device is offline. This information can be used in implementing backup procedures and allocating resources.

In accordance with another embodiment, the number of times a device receives and sends a status data packet can be used as a health indicator. For example, a device that has received and sent more than a predetermined number of status data packets may be considered "connected" to the system, whereas a device that did not receive or send the last status data packet may be considered "disconnected" from the system. Further, a device may be considered in an "evaluation" mode if it received and sent the last data packet but has not received and sent more than the predetermined number of status data packets required to be "connected" to the system. Health indicators may be used, for example, for resource allocation.

In accordance with another embodiment, a device may compare the status of each device as indicated in the data packet with the status of each device as stored in memory. If the status of the devices has not changed and its status has not changed, it may update its time stamp and send the data packet to the next device without saving the status of each device to memory. One of ordinary skill in the art would recognize many variations, modifications, and alternatives.

In accordance with another embodiment, a device within the system may resolve status conflicts. Such conflicts may exist, for example, when more than one conference bridge in a system indicates that it is hosting a particular meeting. In some embodiments, the conflict may be resolved using device and resource identifiers. For example, the device with the lowest (or highest) device identification number may resolve status conflicts using the identifiers of the devices involved and/or the identifier of the resource involved. As an example, if more than one conference bridge in a system indicates that it is hosting a particular meeting, the device with the lowest device identification number recognizes the conflict and uses the identifiers of the devices involved in the conflict and the identifier of the particular meeting to determine which device will host the meeting. The status of the devices involved in the conflict is updated and the conflict is resolved. In other embodiments, the IP addresses of the devices involved in the conflict may be used to resolve the conflict. One of ordinary skill in the art would recognize many variations, modifications, and alternatives.

Figure 4:
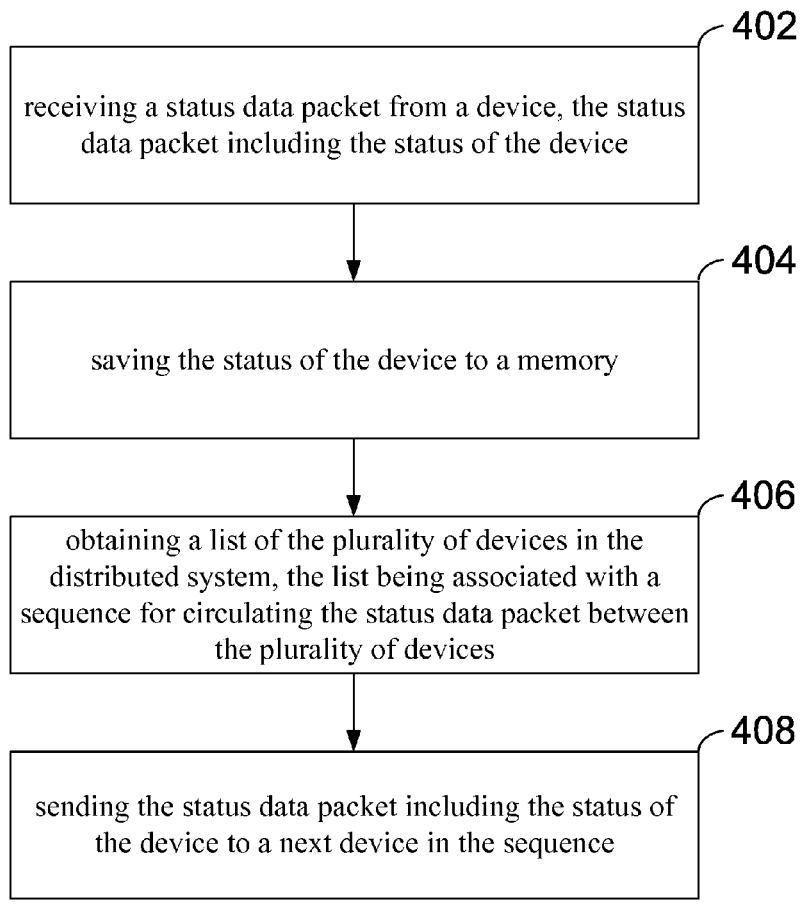
FIG. 4 is a simplified flowchart illustrating a method for providing a status to devices in a distributed system according to an embodiment of the present invention.

FIG. 4 is a simplified flowchart illustrating a method of providing a status to devices in a distributed system according to an embodiment of the present invention. In step 402, a status data packet is received from a device in the distributed system. For example, a conference bridge may receive a status from another conference bridge in a distributed VoIP system. The status data packet includes the status of the device. As explained above, if the status data packet has a different identifier than a previous data packet received by the device, the status data packet may be processed or discarded. If the status data packet is processed, in step 404 the status of the device is saved to a memory. In step 406, a list of the plurality of devices in the distributed system is obtained. For example, the list may be included in the status data packet, or it may be obtained from a particular server or database in the system. The list is associated with a sequence for circulating the status data packet between the plurality of devices in the system. In step 408, the status data packet including the status of the device is sent to a next device in the sequence.

It should be appreciated that the specific steps illustrated in FIG. 4 provide a particular method of providing a status to a plurality of devices in a distributed system according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

In accordance with another embodiment, devices within a VoIP system may be grouped and/or placed in a particular sequence to reduce circulation time. This is the time required to provide a status update to each device (or each connected device) within a system. Reducing the circulation time can improve synchronization between devices and consequently reduce collisions.

As an example of utilizing sequence to reduce circulation time, assume that a system includes four devices (device A, device B, device C, device D). In this system, there is little network lag between device A and device B, and there is little network lag between device C and device D. There is higher network lag, however, between device A and device C, between device A and device D, between device B and device C, and between device B and device D. In this example, a sequence of A→B→C→D→A can be used to reduce circulation time compared to a sequence of A→C→B→D→A. This is because the first sequence includes two communications with little network lag (A→B and C→D) and two communications with higher network lag (B→C and D→A). In contrast, all four communications in the second sequence include higher network lag (A→C, C→B, B→D, D→A).

Figure 5:
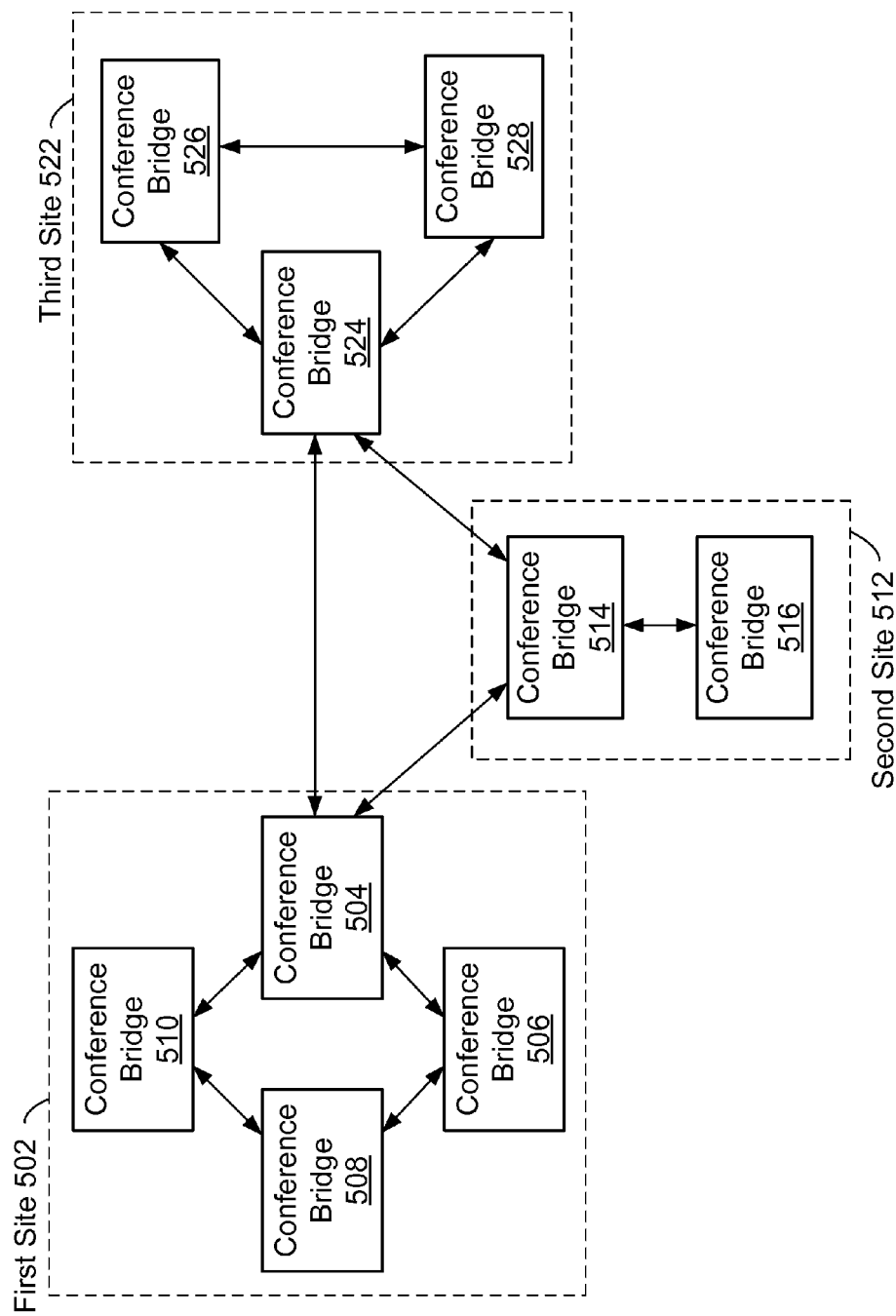
FIG. 5 is a simplified schematic diagram of conference bridges in a distributed VoIP system according to another embodiment of the present invention.

An example of using groupings to reduce circulation time is provided in FIG. 5. This example uses conference bridges that are grouped according to site. These groupings may be used to reduce circulation time if, for example, there is less network lag for communications between devices at the same site than for communications between devices at different sites. It should be appreciated that similar grouping may be applied to other devices within a VoIP system and/or may be determined based on other factors besides different sites.

As can be seen in FIG. 5, using groupings to reduce circulation time can result in a number of groups of devices in a system. Here, the different groups are kept separate and are not merged as in the examples described previously. Each group may include the same or, as shown in this example, a different number of devices. For example, in FIG. 5 a first site 502 includes conference bridge 504, conference bridge 506, conference bridge 508, and conference bridge 510; a second site 512 includes conference bridge 514 and conference bridge 516; and a third site 522 includes conference bridge 524, conference bridge 526, and conference bridge 528.

Each of the groups may circulate a different status data packet. For example, the conference bridges at the first site 502 may circulate a first status data packet, the conference bridges at the second site 512 may circulate a second status data packet, and the conference bridges at the third site 522 may circulate a third status data packet. In addition, as shown in this example, another group is formed that includes conference bridge 504 from the first site 502, conference bridge 514 from the second site 512, and conference bridge 524 from the third site 522. This group may circulate yet another status data packet. For each group, the status data packets may be circulated in accordance with the examples described previously.

Merely to distinguish between the different groups shown in FIG. 5, the groups that include devices within a site may be referred to as inner groups, while the groups that include devices from different sites may be referred to as outer groups. In the example illustrated in FIG. 5 there are three inner groups (one at each site) and one outer group.

Each of the devices in the outer group (in this example conference bridge 504, conference bridge 514, and conference bridge 524) are also members of an inner group. As each of the devices in the outer group receives a status data packet from another device in the inner group, they can update the status data packet with information from the outer group. As each of the devices in the outer group receives a status data packet from another device in the outer group, they can update the status data packet with information from the inner group. In this manner, a status of each device in the system is provided to every other device despite the different groups.

As an example, conference bridge 504, which is a member of the inner group at the first site 502, can receive a status of each of the other devices at the first site 502 (or each of the connected devices at the first site 502) in a manner similar to that described above with regard to FIG. 2. In a similar manner, conference bridge 504, which is also a member of the outer group, can receive a status of each of the other devices in the outer group (conference bridge 514 and conference bridge 524). The status of each of the other devices in the outer group can also include a status of each of the devices from their respective inner groups. For example, conference bridge 514 can update a status data packet circulated by the outer group with a status of conference bridge 516, and conference bridge 524 can update the status data packet circulated by the outer group with a status of conference bridge 526 and conference bridge 528.

In this manner, conference bridge 504 is able to receive a status of each of the other devices in the inner group as well as a status of each of the other devices in the system. For each status data packet that conference bridge 504 receives from the inner group, it updates its status as well as the status of each of the other devices from other sites (information from the outer group). For each status data packet that conference bridge 504 receives from the outer group, it updates is status as well as the status of each of the other devices from the same site (information from the inner group).

In an embodiment, the groupings within a system may be predetermined and one member of each inner group may be assigned to participate in an outer group by an administrator. In another embodiment, members of the outer group may be determined by other criteria. For example, a device with the lowest device identification number (or highest device identification number) in an inner group may participate in the outer group. Further, if a device in an outer group becomes unconnected, another device in the inner group may start participating in the outer group (e.g., an assigned backup or selected based on some other criteria such as next lowest (or next highest) identification number).

As an alternative to grouping the devices by site, in one embodiment the devices may be grouped according to network lag. For example, devices with little network lag may be grouped separately from those with medium and/or higher network lag. In this manner, overall system synchronization can be improved as described above. Collisions that do occur can be resolved using any of the embodiments described herein.

FIG. 6 is a table illustrating an exemplary header structure of a status data packet. In this example, the status data packet includes the header structure illustrated in FIG. 6 and the device status structure illustrated in FIG. 7. The header illustrated in FIG. 6 includes a packet ID, a generation time, a circulation counter, a list of devices in the system, as well as other fields. As explained above, in some embodiments each status data packet is associated with a unique identifier referred to here as the packet ID. The identifier may be determined when the data packet is generated, and the time may include the time the data packet was generated. As explained above, the packet ID and time may be used to determine if a particular data packet is to be processed or discarded. In this example the circulation counter is also included in the data packet. As explained above, the circulation counter is incremented as the status data packet is circulated between the devices in the system. In this example the list of devices in the system is also included in the status data packet. As explained above, the list of devices may be used to determine the sequence or order the status data packet is sent between devices in the system.

FIG. 7 is a table illustrating an exemplary device status structure of a status data packet. In this example, the device status includes the device ID, the number of meetings hosted by the device and the number of users associated with the meetings, the time of the last status update, and other fields. As explained above, each device may be associated with a device identification referred to here as the device ID. The device ID may be used to determine which device updates the circulation counter. In some embodiments, the device ID may be used to determine the order of the devices in the list. In this example, the device is a conference bridge and the device status includes the number of meetings hosted by the conference bridge and the number of users associated with the meetings. This information is specific to the particular device type, and may include information used for backup and resource management. As explained above, the status of each device may include a time stamp referred to here as the time of the last status update. This may be used by other devices to determine if the status is up to date. In one embodiment where the status update is provided between conference bridges, updating the status data packet includes updating the number of meetings hosted, the number of users attached to the meetings, and the time of the last status update.

Some embodiments of the present invention also provide methods and apparatuses for resolving conflicts in distributed systems. Conflicts may arise, for example, when more than one device in the system provides a resource that is normally provided by a single device. Because more than one device is providing the resource, decisions may be made or actions taken that may conflict or be duplicative and consume unnecessary resources. As an example, a conflict between conference bridges in a distributed conferencing system may arise when more than one conference bridge believes that it is the leader or host of a meeting. As a meeting leader, a conference bridge may determine when a meeting begins and ends, determine how many callers can participate in the meeting, determine if the meeting involves audio, video, or web resources, determine if the meeting is to be recorded, and the like. If two different conference bridges are making these decisions for the same meeting, there is a likelihood that decisions will be made that directly conflict or resources may be expended that are unnecessarily duplicated. Conflicts may also arise in determining which device in the system should provide a resource. As an example, a conflict may arise in making an initial determination as to which conference bridge in a distributed conferencing system will lead a particular meeting. The methods and apparatuses described below can be used to resolve all such conflicts.

Figure 8:
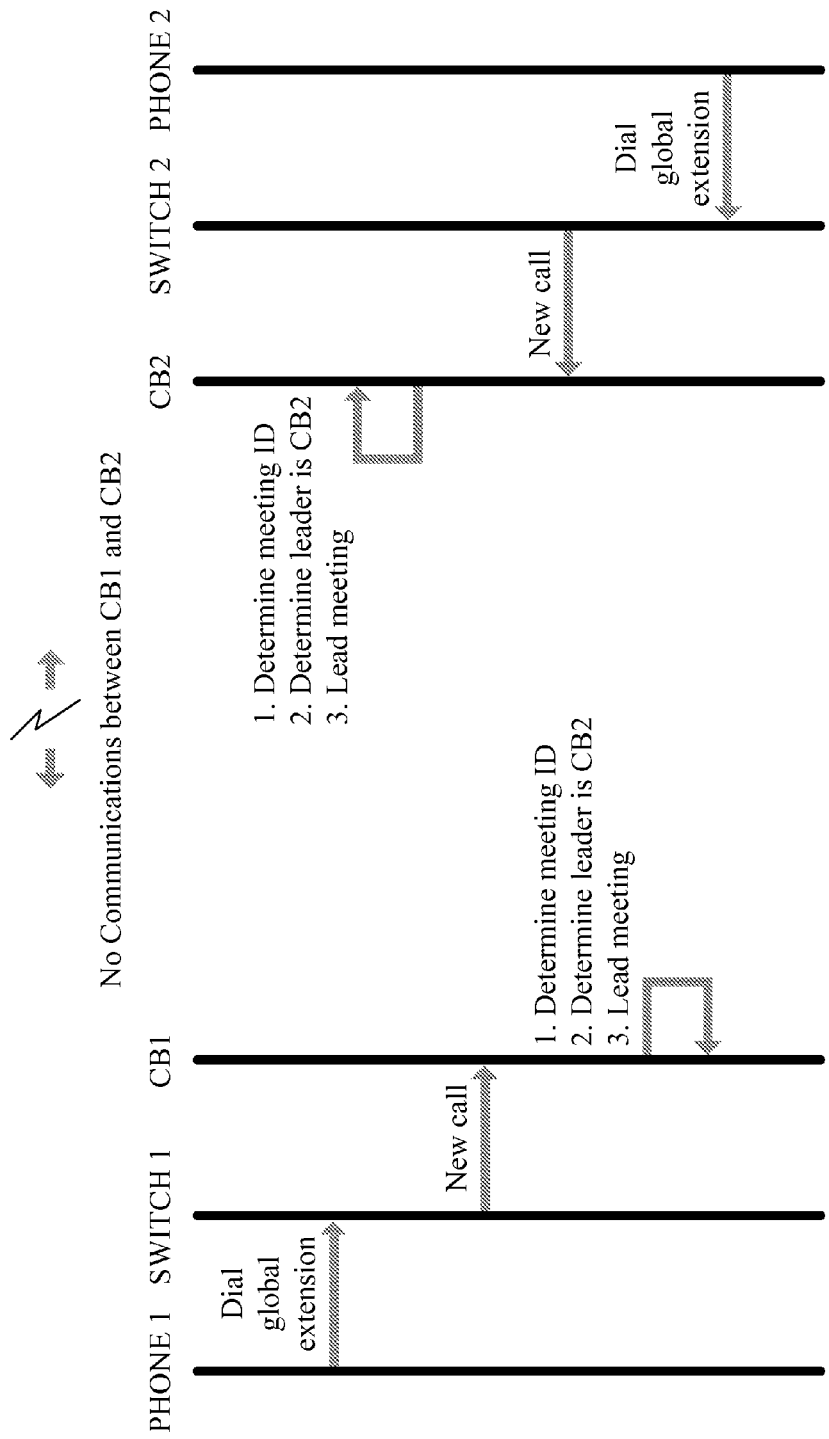
FIG. 8 is a simplified diagram illustrating an occurrence of a conflict between a first conference bridge and a second conference bridge in a distributed conferencing system.

An exemplary occurrence of a conflict between a first conference bridge and a second conference bridge in a distributed conferencing system is illustrated in FIG. 8. This figure shows two groups of devices in a distributed system where communications between the groups have been lost. Such a scenario may arise when a network connection is down or a device in the system is offline. One group of devices includes PHONE 1, SWITCH 1, and CB1 (or conference bridge 1), and the other group of devices includes PHONE 2, SWITCH 2, and CB2 (or conference bridge 2). As illustrated in FIG. 8, a caller using PHONE 1 dials a global extension that is sent to SWITCH 1, and SWITCH 1 identifies and forwards a new call to CB1. In this example, the new call may be to join a meeting that has been previously scheduled or to request a new meeting. The new call may include an access code that is used by CB1 to determine an ID of the meeting that the caller or participant wishes to join or information necessary to set up a new meeting. In this example, CB1 determines that the leader of the meeting is preferably CB2. Because CB1 is unable to communicate with CB2, however, CB1 takes ownership and starts the meeting. As explained above, this may include providing one or more of a number of resources for the meeting. In this example, CB1 may know that CB2 is offline based on information in a status data packet received by CB1 from another conference bridge in the system. Alternatively, CB1 may be offline and not communicating with any other conference bridges in the system or may only be communicating with a subset of the conference bridges in the system. In any case, CB1 takes ownership of the meeting because it is unable to forward the new call to CB2.

FIG. 8 also shows that a caller using PHONE 2 dials a global extension that is sent to SWITCH 2, and SWITCH 2 identifies and forwards a new call to CB2. In this example, the caller is a participant in the same meeting as the caller using PHONE 1. The new call may include an access code that is used by CB2 to determine the ID of the meeting that the caller or participant wishes to join or information necessary to set up a new meeting. Like CB1, CB2 also determines that it is preferably the leader of the meeting. Because CB2 is unable to communicate with CB1, CB2 is unaware that the same meeting is being hosted by CB1 and starts the meeting with the caller who is using PHONE 2. In this scenario, two separate sessions of the same meeting are now being hosted by two different conference bridges. The caller using PHONE 1 will participate in one session of the meeting that may or may not be joined by other callers who are able to communicate with CB1. The caller using PHONE 2 will participate in a separate session of the meeting that may or may not be joined by other callers who are able to communicate with CB2. Although both callers intended to join the same meeting, they actually join different sessions of the same meeting and are unaware of the other session because there are no communications between CB1 and CB2. Such a scenario obviously leads to an unpleasant user experience for the callers who are prevented from joining the same session and from communicating with each other as intended.

A situation similar to that depicted in FIG. 8 may also occur if communications between conference bridges are lost during a meeting. For example, CB1 may be hosting a meeting when communications are lost between CB1 and other conference bridges in a distributed conferencing system. Realizing that communications have been lost, another conference bridge, such as CB2, may begin hosting the meeting for all callers for which it has communications. In this situation, CB1 may continue hosting one session of the meeting with the callers it has communications with, and CB2 may start hosting a second session of the meeting for the callers for which it has communications with. If communications between CB1 and CB2 are re-established, there will be two leaders or hosts of the same meeting. As explained previously, this can lead to a conflict where decisions are made or actions taken that conflict or the conference bridges may provide unnecessarily duplicative resources.

If communications between CB1 and CB2 are restored while both conference bridges are hosting separate sessions of the same meeting, the conference bridges may recognize that communications have been restored and that two different sessions of the same meeting exist. The conference bridges may receive this information from a status data packet indicating that the other conference bridge is online and hosting the same meeting. One option to resolve the conflict of multiple ownership would be to terminate the meeting at all conference bridges and wait for the callers to initiate a new session of the meeting. In this case the conference bridge that was originally scheduled to lead the meeting could take ownership of the new meeting. This is not an optimal solutions for the callers, however, who would be dropped from the meeting and would have to call back in. Another option to resolve the conflict would be to transfer ownership of the meeting to the conference bridge that was originally scheduled to lead the meeting without dropping the callers from the different sessions. This option would only work, however, when the conference bridge that was originally scheduled to lead the meeting is back online which may or may not be the case. It is just as likely that the meeting was hosted by two different conference bridges neither one of which were originally scheduled to lead the meeting.

As another example of a scenario in which a conflict may arise, different conference bridges in a system may receive requests for a new meeting from different media clients. For example, a first request for a meeting may be received by a first conference bridge from a first participant using a phone, a second request for the same meeting may be received by a second conference bridge from a second participant using a web client, and a third request for the same meeting may be received by a third conference bridge from a third participant using a video client. If the requests are each received before a list, such as a meeting resource list, can be updated, each conference bridge may determine that the meeting is not being hosted by another conference bridge in the system and start hosing the meeting. This may lead to a conflict where three different conference bridges are leading or hosting the same meeting.

Figure 9:
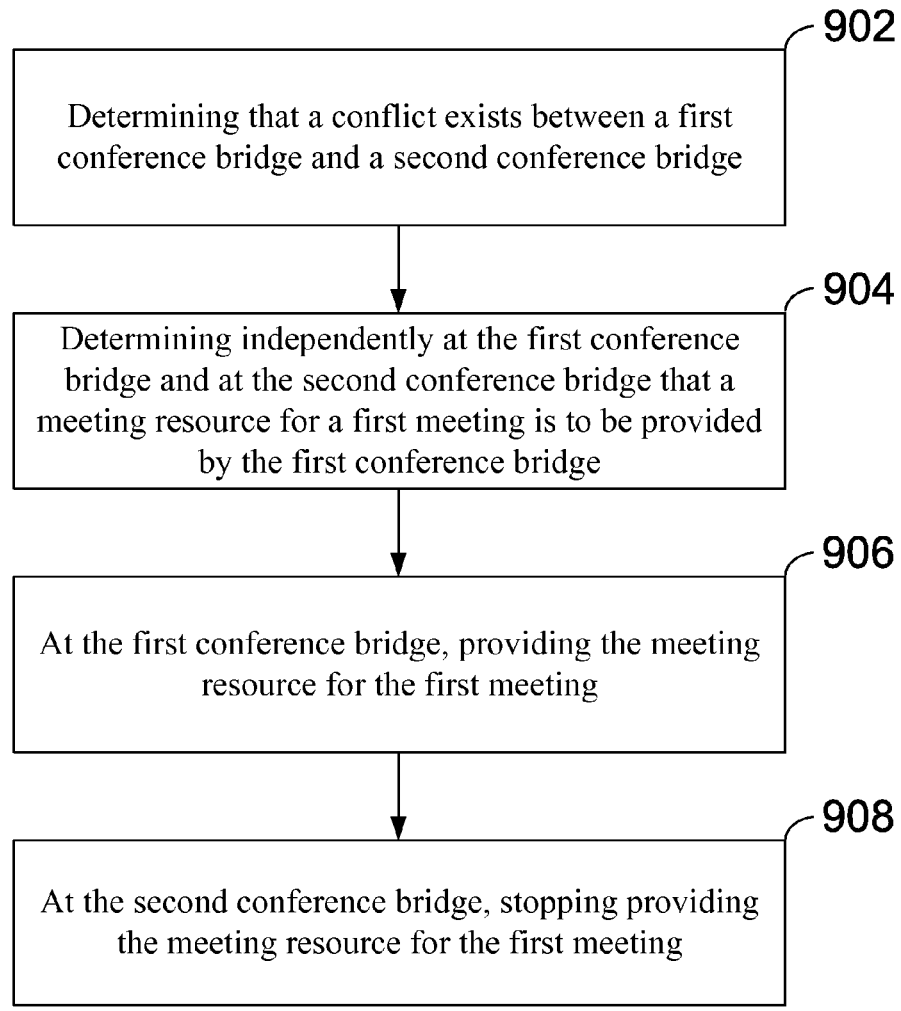
FIG. 9 is a simplified flowchart illustrating a method for resolving conflicts between conference bridges in a distributed conferencing system according to an embodiment of the present invention.

Embodiments of the present invention provide improved methods for resolving conflicts between devices in a distributed system in these and other scenarios. As an example, FIG. 9 is a simplified flowchart illustrating a method for resolving conflicts between conference bridges in a distributed conferencing system according to an embodiment of the present invention. The method involves determining that a conflict exists between a first conference bridge and a second conference bridge (902). The conflict may arise from the first conference bridge and the second conference bridge independently providing a meeting resource for a first meeting that is to be provided by a single conference bridge in the distributed conferencing system. The meeting resource may include leading the first meeting, acting as a web-master for the first meeting, or providing audio, video, or web recording for the first meeting. Determining that a conflict exists may include receiving a status data packet at the first conference bridge and determining that the meeting resource for the first meeting is being provided by the second conference bridge based on data in the status data packet.

The method also involves determining independently at the first conference bridge and at the second conference bridge that the meeting resource for the first meeting is to be provided by the first conference bridge (904). In an embodiment, in determining that the meeting resource is to be provided by the first conference bridge there is a probability of determining that the meeting resource is to be provided by the second conference bridge. This avoids default rules that may lead to unfair allocation of resources between the conference bridges (e.g., leadership always goes to the conference bridge with the lowest or highest ID). In an embodiment, the first conference bridge and the second conference bridge may utilize the same process in determining which conference bridge is to provide the meeting resource for the first meeting.

The process used to determine which conference bridge is to provide the meeting resource may involve using a hash function to determine a value for the first conference bridge and a value for the second conference bridge. As an example, the hash function may include a mathematical expression that provides a high probability of determining unique and random values for each conference bridge involved in the conflict. In one embodiment, the mathematical expression includes the equation:

$$\text{Conference Bridge Value} = (\text{Meeting ID} + x)/(\text{Conference Bridge ID} + y) \quad \text{Equation (1)}$$

where the Meeting ID is a value assigned to the particular meeting that is unique amongst the meetings being hosted by conference bridges in the system, the Conference Bridge ID is a value assigned to the conference bridge that is unique amongst the conference bridges in the system, and x and y are fixed values chosen for the particular system. In one embodiment, for example, x and y may be assigned the values 10000 and 99, respectively. Such a hash function can be used to determine values that are generally unique and random. In the event that the same value is determined for more than one conference bridge involved in a conflict, a value unique to each conference bridge (e.g., IP address, Conference Bridge ID, or the like) can be used as a tie breaker. Using such a process can provide values for the first conference bridge and the second conference bridge. Using the values, a determination can be made as to which conference bridge should provide the meeting resource. For example, the conference bridge with the highest (or lowest) value may be selected to provide the meeting resource. Such a process is advantageous in that it is deterministic (i.e., each conference bridge involved in the conflict can independently determine which conference bridge should provide the meeting resource and the determination is not time dependent). Such a process also allows conflicts to be resolved with minimal or no direct communication between the conference bridges involved in the conflict.

In the exemplary method illustrated in FIG. 9, it is determined that the meeting resource is to be provided by the first conference bridge (904). The method also includes providing the meeting resource for the first meeting at the first conference bridge (906) and stopping providing the meeting resource for the first meeting at the second conference bridge (908). In an embodiment, stopping providing the meeting resource includes initiating a cascading bridge request between the second conference bridge and the first conference bridge. A cascading bridge may involve utilizing more than one conference bridge to provide resources (e.g. audio, video, and/or web) for a meeting. In another embodiment, stopping providing the meeting resource includes transferring any users of the resource at the second conference bridge to the first conference bridge. These embodiments allow participants to be joined to the first meeting without dropping them or requiring them to call back in to the meeting.

Figure 10:
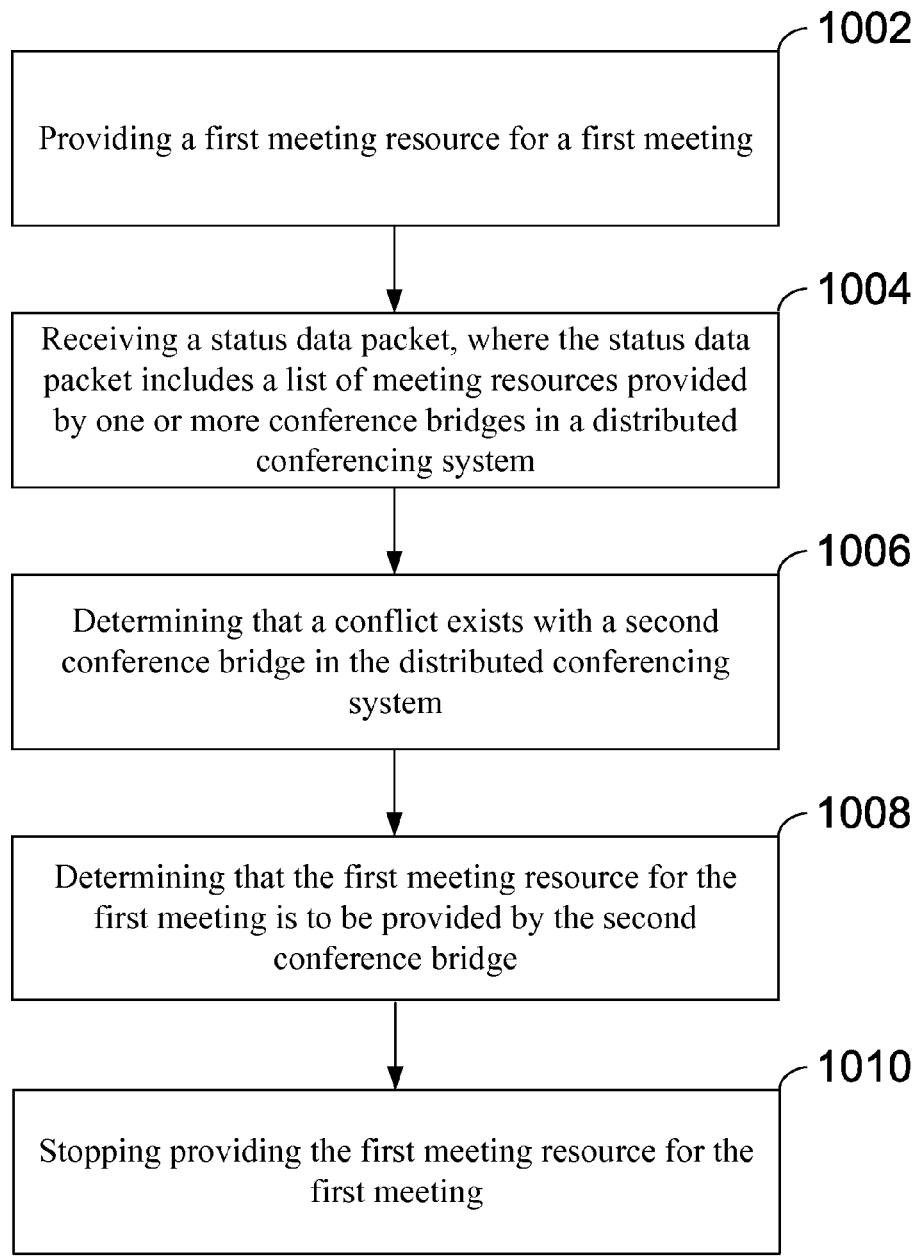
FIG. 10 is a simplified flowchart illustrating a method for resolving conflicts between conference bridges in a distributed conferencing system according to another embodiment of the present invention.

FIG. 10 is a simplified flowchart illustrating a method for resolving conflicts between conference bridges in a distributed conferencing system according to another embodiment of the present invention. The method involves providing a first meeting resource for a first meeting at a first conference bridge (1002). The meeting resource may include leading the first meeting or providing audio or web recording for the first meeting. The method also involves receiving a status data packet at the first conference bridge, where the status data packet includes a list of meeting resources provided by one or more of the conference bridges in the distributed conferencing system (1004). The method also includes determining at the first conference bridge that a conflict exists with a second conference bridge in the distributed conferencing system (1006). The conflict may arise from the first conference bridge and the second conference bridge independently providing the first meeting resource for the first meeting that is to be provided by a single conference bridge in the distributed conferencing system. The conflict may be determined based on the list of resources in the status data packet. The method also includes determining at the first conference bridge that the first meeting resource for the first meeting is to be provided by the second conference bridge (1008). In determining that the first meeting resource is to be provided by the second conference bridge, a process may be utilized that provides a probability of determining that the first meeting resource is to be provided by the first conference bridge. In an embodiment, the process may include using a hash function or another mathematical expression to determine a first value for the first conference bridge and a second value for the second conference bridge. The method also includes stopping providing the first meeting resource for the first meeting (1010). In an embodiment, stopping providing the meeting resource includes initiating a cascading bridge request between the first conference bridge and the second conference bridge. In another embodiment, stopping providing the meeting resource includes transferring any users of the resource at the first conference bridge to the second conference bridge.

It should be appreciated that the specific steps illustrated in FIGS. 9-10 provide particular methods for resolving conflicts between conference bridges in distributed conferencing systems according to exemplary embodiments of the present invention. Other sequences of steps may also be performed according to alternative embodiments. For example, alternative embodiments of the present invention may perform the steps outlined above in a different order. Moreover, the individual steps illustrated in FIGS. 9-10 may include multiple sub-steps that may be performed in various sequences as appropriate to the individual step. Furthermore, additional steps may be added or removed depending on the particular applications. One of ordinary skill in the art would recognize many variations, modifications, and alternatives.

Similar methods can be used to resolve conflicts that may arise in determining which device in a distributed system should provide a particular resource. Such conflicts may arise, for example, when a device initially receives a request to provide a resource. Rather than automatically providing a resource upon request, a method may be used that more evenly distributes resources amongst devices in the system. In one embodiment, for example, a device receiving a request to provide a resource (e.g., a conference bridge receiving a request to host a meeting) may determine a value for the device and a value for one or more other devices in the system. The values may be determined using a hash function as described previously. The hash function may take into account the resource being requested (e.g., meeting ID). The device may independently determine which device in the system is to provide the resource based on the determined values. As described previously, such a resolution may be deterministic in that the same resolution may be determined regardless of the device or devices making the determination or the time at which the determination is made.

Figure 11:
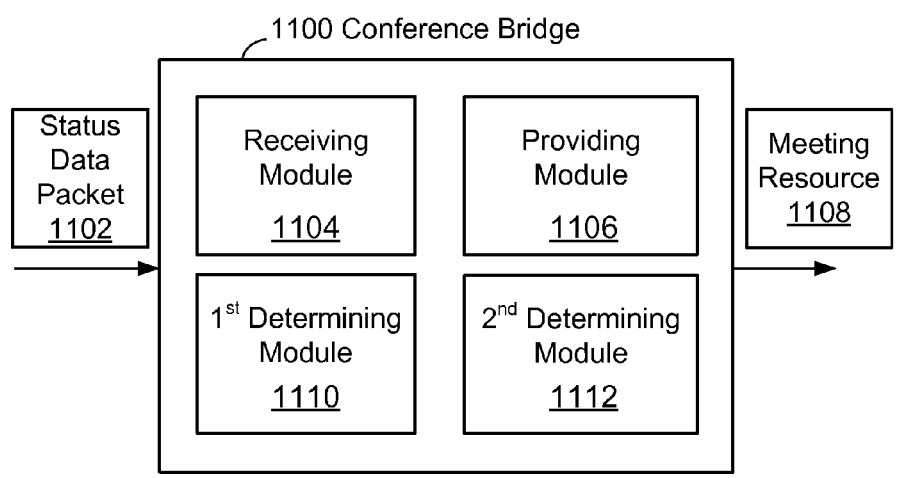
FIG. 11 is a simplified block diagram of a conference bridge configured to resolve conflicts in a distributed conferencing system according to an embodiment of the present invention.

FIG. 11 is a simplified block diagram of a conference bridge 1100 configured to resolve conflicts in a distributed conferencing system according to an embodiment of the present invention. The conference bridge 1100 includes a providing module 1106 configured to provide a meeting resource 1108 for a first meeting. The conference bridge 1100 also includes a receiving module 1104 configured to receive a status data packet 1102. The status data packet may be received from another conference bridge in the distributed conferencing system. The conference bridge 1100 also includes a first determining module 1110 configured to determine that a conflict exists between the first conference bridge and a second conference bridge in the distributed conferencing system. The conflict may arise from the first conference bridge and the second conference bridge independently providing the meeting resource for the first meeting that is to be provided by a single conference bridge in the distributed conferencing system. The conference bridge 1100 may determine that there is a conflict based on data in the status data packet 1102. The conference bridge 1100 also includes a second determining module configured to determine that the meeting resource for the first meeting is to be provided by the first conference bridge. In determining that the meeting resource is to be provided by the first conference bridge, a process may be utilized that provides a probability of determining that the meeting resource is to be provided by the second conference bridge. In an embodiment, the process may include using a hash function to compute a first value for the first conference bridge and a second value for the second conference bridge. It should be appreciated that each of the preceding modules may be embodied in hardware, as a set of instructions embodied as code on a non-transitory computer readable medium, as a set of instructions embodied as code in conference bridge 1100 memory, as a set of instructions embodied within an application specific integrated circuit, or the like. One of ordinary skill in the art would recognize many variations, modifications, and alternatives.

Note that in FIGS. 1-3, 5, and 8 the links between the various components are shown using arrows. These links are not limited to physical connections, but may also represent logical connections between the components. Where the links represent physical connections, they may represent wired or wireless connections. For example, FIG. 1 shows switch 114 linked with IP phone 104 and soft phone 106. These links may be wired, wireless, or a combination of wired and wireless technologies.

While the present invention has been described in terms of specific embodiments, it should be apparent to those skilled in the art that the scope of the present invention is not limited to the embodiments described herein. For example, it is to be understood that the features of one or more embodiments of the invention may be combined with one or more features of other embodiments of the invention without departing from the scope of the invention. The examples and embodiments described herein are for illustrative purposes only and various modifications or changes in light thereof will be suggested to persons skilled in the art and are to be included within the spirit and purview of this application and scope of the appended claims.

What is claimed is:

1. A method for providing a status to conference bridges in a distributed system, the status comprising a list of meetings hosted by one or more of the conference bridges, the method comprising:
    at a second conference bridge:
        receiving a status data packet, the status data packet sent from a first conference bridge to the second conference bridge and including the status of the first conference bridge, the status of the first conference bridge including a list of meetings hosted by the first conference bridge;
        saving the status of the first conference bridge to a memory of the second conference bridge;
        updating the status data packet with a status of the second conference bridge, the status of the second conference bridge including a list of meetings hosted by the second conference bridge;
        obtaining a list of the conference bridges in the distributed system, the list providing a sequence for circulating the status data packet between the conference bridges, the sequence determined by:
            determining a network lag between each of the conference bridges; and
            determining the sequence by using the network lag to minimize a number of higher network lag communications between the conference bridges;
        sending the status data packet including the status of the first conference bridge and the status of the second conference bridge from the second conference bridge to a next conference bridge in the sequence.

2. The method of claim 1 further comprising sending an acknowledgement of receipt of the status data packet from the second conference bridge to the first conference bridge.

3. The method of claim 1 further comprising receiving an acknowledgement of receipt of the status data packet from the next conference bridge in the sequence.

4. The method of claim 1 wherein the status data packet includes an ID of the first conference bridge and a time associated with receiving the status data packet at the second conference bridge.

5. The method of claim 1 wherein the distributed system is a distributed VoIP system.

6. The method of claim 1 wherein the next conference bridge is a last conference bridge in the sequence, and the last conference bridge sends the status data packet to the first conference bridge, the first conference bridge being a first conference bridge in the sequence.

7. The method of claim 1 further comprising incrementing a circulation counter after receiving the status data packet.

8. The method of claim 1 wherein the status data packet includes the list of the conference bridges in the distributed system.

9. The method of claim 1 further comprising:
    at the second conference bridge:
        waiting a period of time;
        determining that an acknowledgement of receipt of the status data packet is not received from the next conference bridge during the period of time; and
        sending the status data packet to a following conference bridge in the sequence, the following conference bridge being after the next conference bridge in the sequence.

10. The method of claim 9 wherein the period of time is determined based at least in part on a time duration required for the next conference bridge to receive the status data packet and send an acknowledgement of receipt of the status data packet.

11. The method of claim 1 further comprising:
    at the second conference bridge:
        waiting a period of time after receiving the status data packet and before sending the status data packet to the next conference bridge, wherein the period of time is greater than a time duration required to save the status of the first conference bridge to the memory and obtain the list of the plurality of conference bridges in the distributed system.

12. The method of claim 11 wherein the period of time is based at least in part on a number of the conference bridges.

13. A method for providing a status to a plurality of conference bridges in a distributed VoIP system, the status comprising a list of meetings hosted by one or more of the plurality of conference bridges, the plurality of conference bridges comprising at least a first group of conference bridges and a second group of conference bridges, the method comprising:
    circulating a first status data packet between each conference bridge in the first group, the first status data packet comprising the status of each conference bridge in the first group including a list of meetings hosted by conference bridges in the first group;
    circulating a second status data packet between each conference bridge in the second group, the second status data packet comprising the status of each conference bridge in the second group including a list of meetings hosted by conference bridges in the second group;
    wherein one conference bridge in the first group participates in circulating both the first status data packet and the second status data packet, while the other conference bridges in the first group circulate only the first status data packet; and
    wherein one conference bridge in the second group participates in circulating both the first status data packet and the second status data packet, while the other conference bridges in the second group circulate only the second status data packet; and wherein the one conference bridge in the first group that participates in circulating both the first status data packet and the second status data packet updates the first status data packet with the status of each of the conference bridges in the second group and updates the second status data packet with the status of each of the conference bridges in the first group.

14. The method of claim 13 wherein the one conference bridge in the first group that participates in circulating both the first status data packet and the second status data packet and the one conference bridge in the second group that participates in circulating both the first status data packet and the second status data packet are the same conference bridge.

15. The method of claim 13 wherein the one conference bridge in the first group that participates in circulating both the first status data packet and the second status data packet is selected based on a device identification number of the one conference bridge compared to device identification numbers of the other conference bridges in the first group.

16. The method of claim 13 wherein each of the conference bridges in the first group has a network lag that on average is different from that of each of the conference bridges in the second group.

17. The method of claim 13 wherein the plurality of conference bridges include a third group of conference bridges, the method further comprising:

circulating a third status data packet between each of the conference bridges in the third group;

wherein one conference bridge in the third group participates in circulating both the third status data packet and the second status data packet, while the other conference bridges in the third group circulate only the third status data packet.

18. A non-transitory computer readable medium including computer program code for providing a status to a plurality of conference bridges in a distributed VoIP system, the status comprising a list of meetings hosted by one or more of the plurality of conference bridges, the plurality of conference bridges comprising at least a first group of conference bridges and a second group of conference bridges, the computer readable medium comprising:

code for circulating a first status data packet between each of the conference bridges in the first group, the first status data packet comprising the status of each conference bridge in the first group including a list of meetings hosted conference bridges in the first group;

code for circulating a second status data packet between each of the conference bridges in the second group, the second status data packet comprising the status of each conference bridge in the second group including a list of meetings hosted conference bridges in the second group;

wherein one conference bridge in the first group participates in circulating both the first status data packet and the second status data packet, while the other conference bridges in the first group circulate only the first status data packet;

wherein one conference bridge in the second group participates in circulating both the first status data packet and the second status data packet, while the other conference bridges in the second group circulate only the second status data packet; and wherein the one conference bridge in the first group that participates in circulating both the first status data packet and the second status data packet updates the first status data packet with the status of each of the conference bridges in the second group and updates the second status data packet with the status of each of the conference bridges in the first group.

* * * * *